June 10, 1969     H. H. SIMMONS     3,449,739

CLOCK CONTROLLED SIGNALLING SYSTEM

Original Filed Aug. 7, 1964

INVENTOR.
HERBERT H. SIMMONS
BY
Hoppe & Mitchell
his ATTORNEYS

FIG_12

3,449,739
CLOCK CONTROLLED SIGNALLING SYSTEM
Herbert H. Simmons, 377 Church St.,
San Francisco, Calif. 94114
Continuation of application Ser. No. 388,233, Aug. 7,
1964. This application July 9, 1968, Ser. No. 746,701
Int. Cl. G08b 1/08, 3/00; H01h 43/10
U.S. Cl. 340—309.4
4 Claims

ABSTRACT OF THE DISCLOSURE

One or more output signals are generated in the control system in accordance with a predetermined time schedule. The control system has a pair of power distributors connected in series with a plurality of switch means provided in the power paths and with the power inlet and power outlet means. Each power distributor includes a movable conductor element. One movable conductor element of one power distributor acts to sequentially contact each of the groups of switch means while the second movable conductor element of the other power distributor acts sequentially to interconnect each switch means in each group of switch means with the power inlet and power outlet. Presetting of the control system is done through manually operable switches that are interposed between the power outlets and the power inlets.

This application is a continuation of Ser No. 388,233 filed on Aug. 7, 1964, now abandoned.

---

The invention relates to a control system in which one or more output signals are generated in accordance with a predetermined time schedule. The invention is particularly adapted for providing a multiple alarm system for clocks and other timing devices and will be described hereinafter with reference to such an application. However, it is to be understood that the invention is not so limited but may be employed in any application requiring the initiation of single or multiple control functions at preset future time intervals.

One object of the invention is the provision of an electrical control system which will provide a large number of possible control signals or impulses and which will permit the time occurrence of the control signals impulses to be easily scheduled and preset. Another object of the invention is the provision of a control system which will provide an automatically repetitive control signal or impulse cycle or a temporary, one-time self-cancelling control signal or impulse. Still another object of the invention is to provide a control system in a compact device which will still permit the presetting of a great number of future control impulses.

Other objects of the invention will be apparent from a reading of the following specification or will be pointed out hereinafter.

Briefly, and in general, the invention comprises a control system having electrical power inlet and power outlet means. A plurality of power paths are interposed between the power inlet and power outlet means and suitable switch means are provided in each of the power paths so that the flow of electric power through any or all of the paths may be permitted or interrupted as desired. The switch means in the power paths are arranged in a plurality of groups having at least one switch means therein. Manually operable means are provided for opening and closing the switch means in accordance with a predetermined pattern. The power paths are then sequentially interconnected in series with said power inlet and power outlet.

More specifically, the invention contemplates a control system as described in which a pair of power distributors are connected in series with the plurality of switch means provided in the power paths and with the power inlet and power outlet means of the system. Each power distributor includes a movable conductor element. One conductor element acts to sequentially contact each of the groups of switch means while the second movable conductor element acts sequentially to interconnect each switch means in each group of switch means with the power inlet and power outlet.

In one form of the invention power from a suitable source is first fed to a power distributor. The distributor functions to distribute the power sequentially to a plurality of primary power outlets which may be arranged in groups so that during a preselected period of time (which may conveniently be selected as one hour) only one group of primary power outlets is provided with power. Each group of power outlets may contain as many outlets as are necessary to provide the desired number of control impulses. Thus, for example, if each group of power outlets is selected to represent an hour of time, it may be provided with twelve outlets so as to obtain power impulses at five minute intervals. If more frequent impulses are desired, additional outlets may be provided until the number of outlets is such as to give the degree of frequency desired in the system. In the embodiments of the invention shown in the accompanying drawings and described hereinafter, each group of outlets represents an hour's duration and each group has twelve individual outlets so as to provide control impulses at five minute intervals.

The control system is also provided with a second power distributor which, in this form of the invention, serves as a power impulse collector to transfer one or more power output signals or impulses to some suitable signal responsive means such as a switch or alarm ringing apparatus. The impulse collector functions to gather the control power impulses from preselected outlets in the groups of outlets served by the power distributor. Both the impulse collector and the power distributor may be driven by the same source so as to operate in proper time relation with respect to each other. Accordingly, the collector may be provided with as many impulse collecting stations or points as there are power outlets in a group or some aliquot number thereof. In a system using an electrical power source, which is preferred, the collecting stations will be electrical contact points.

Predetermination or presetting of the control system is done through manually operable switches that are interposed between the power outlets and the power inlets. A secondary power inlet may be provided for each primary power outlet and the switches permit a selective coupling of each output in each group with the signal responsive device or work producing apparatus so that the latter may be energized by a control power impulse during any desired control interval. Arrangement of the switches may be such that unless the individual switches are closed, the power outlets are not connected to the respective power inlets and no signal impulses will be transferred for those control intervals.

In the specific form of the invention just described, the arrangement is such that the switches are physically interposed between the power distributor and the impulse collector. This particular arrangement may be modified and the distributor and collector may be positioned either ahead or behind the control switches in the system.

For the purpose of illustrating how the invention may be made and practiced, two embodiments thereof are shown in the accompanying drawings and these embodiments will now be described in detail. It is to be understood, however, that the description to follow is by way of example only and is not intended to define or restrict the scope of the invention in any way. The claims appended hereto, together with their lawful equivalents, are relied upon for that purpose.

Figure 1:
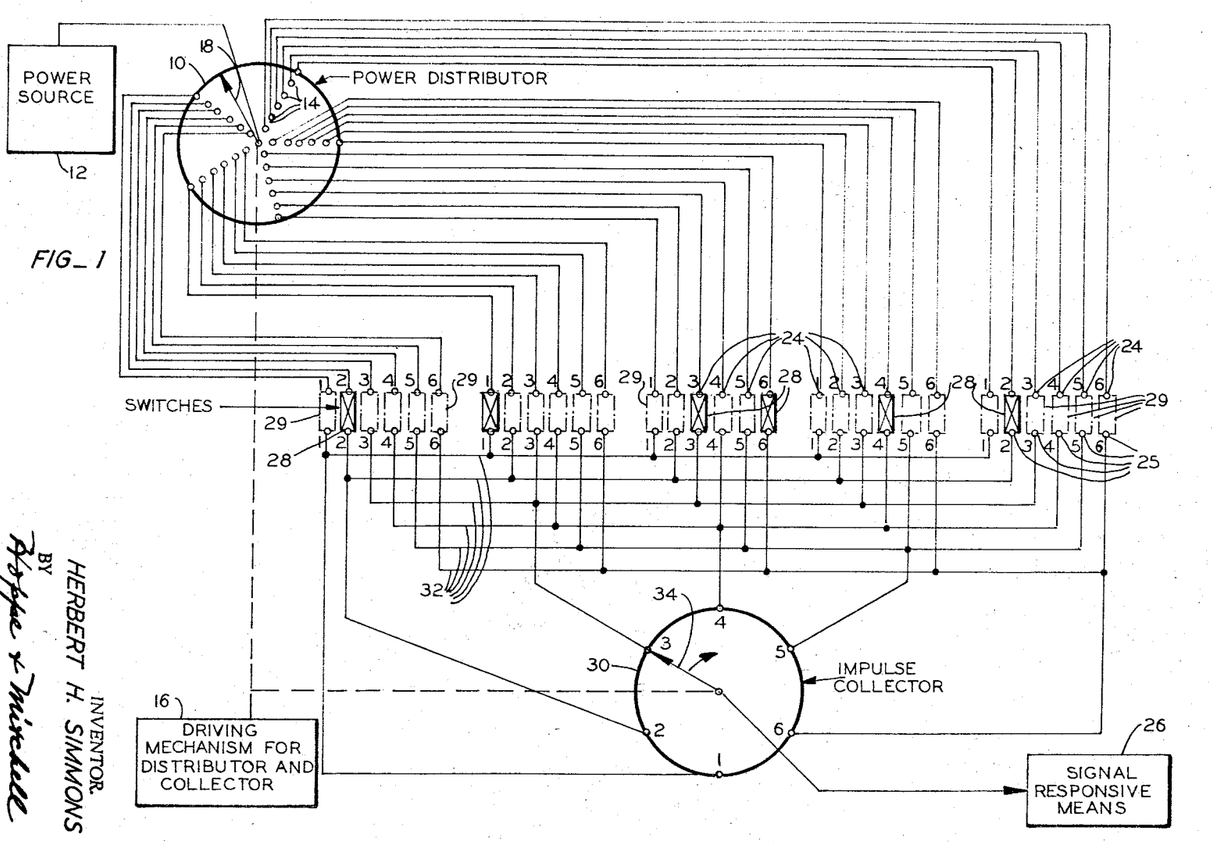
FIGURE 1 is a schematic representation of one form of applicant's control system.

Reference will first be had to FIGURE 1 to explain the mode of operation of applicant's control system. As shown there, power is first transmitted to a power distributor 10 from a suitable source of power 12 which preferably is a source of electrical potential. The distributor 10 serves to distribute the power sequentially to groups of power inlet points or contacts 14, 14. Five such groups 14, 14 are shown in the drawing but any number of groups may be provided as desired. In the drawing, a rotating distributor is shown, but any other suitable distributing device may be employed, as well. The distributor 10 is driven by a suitable mechanism 16 such as a clock mechanism, a counting device or some other type of measuring apparatus.

As the rotating conductor element 18 of the distributor 10 moves from one to another of the groups of power inlets 14, 14, the inlet contacts in each group are connected in sequence with corresponding power outlets 24, 24. In the illustrative example shown in FIGURE 1, five groups of six inlet points are provided, each of which is connected with a corresponding power outlet contact 24, 24 making thirty terminal points or outlets 24, 24 at which power impulses may be obtained. Obviously, additional power outlets could be provided, if desired.

The large number of power outlets 24, 24 available for control functions are utilized by providing selective means for coupling certain desired power outlets 24, 24 with a second power distributor which, in this instance, serves as a power impulse collector 30. Accordingly, manually operable switches 28, 29 are provided at the power outlets 24, 24 and, when the switches 28, 29 are closed, these switches connect the power outlets to the power impulse collector 30 through the secondary power inlets 25, 25 and the conductors 32, 32. For clarity, the unused or unclosed switches 29, 29 are shown in phantom outline in the drawings. The impulse collector 30 is rotatable and is driven by the same mechanism 16 that is used to drive the distributor 10 so that a constant timed ratio between rotation of the collector 30 and that of the distributor 10 is always maintained. A number of collecting stations (1, 2, 3, 4, 5 and 6) are provided on the collector 30 and the number of stations is, in this instance, made equal to the number of power outlets 24, 24 in each group of inlet points 14, 14. The number of stations on this power distributor need not be equal to the number in the groups of contacts on the other distributor as long as they are an aliquot number. The conductors 32, 32 are so arranged that each secondary power inlet point 25, 25 is connected to its corresponding station counterpart in the collector 30. Inasmuch as only one group of primary power inlets 14, 14 is supplied with power at any one time, the rotating element 34 of the collector 30 serves to sequentially connect each power outlet 24, 24 with a suitable signal responsive means 26. Thus, each power outlet 24 having a closed switch 28 will, in proper sequence, be connected to the signal responsive device 26.

Figure 2:
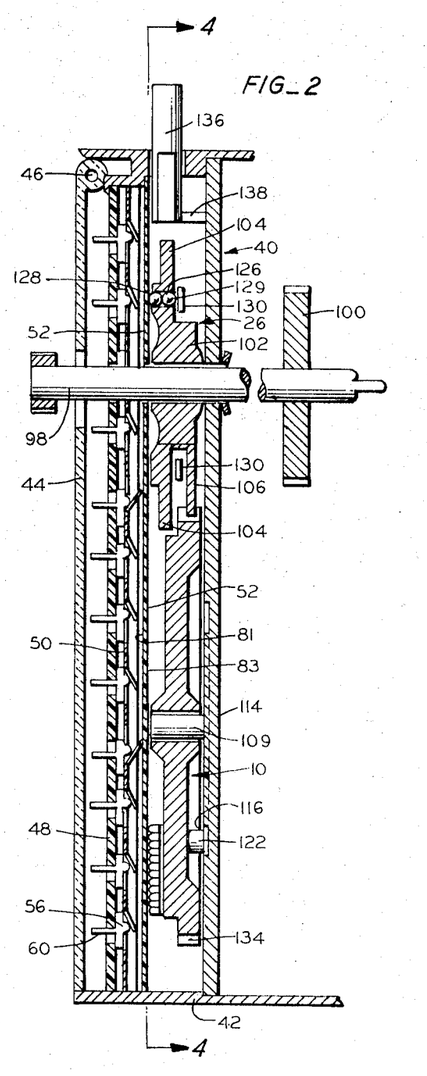
FIGURE 2 is a sectional view in side elevation through a clock device incorporating the control system schematically shown in FIGURE 1.

There is shown in FIGURE 2 a control device 40 incorporating the teachings of the present invention. The control device 40 is adapted to be positioned at the back of a clock or other timing device and is enclosed, in this instance, by the other clock casing 42. The control device could also be incorporated into an auxiliary appliance, if desired. At its outer end, the casing 42 has a transparent face 44 that serves as a protective cover for the control mechanisms inside the casing and the face 44 is pivoted at the upper part 46 of the casing so as to be swingable out of the way whenever access to the control mechanisms is desired.

Immediately behind the transparent face 44 are a number of control panels 48, 50 and 52. The first, or outermost, panel 48 is a switch panel or switchboard. As will be best seen in FIGURES 3 and 5, the switch panel 48 comprises a flat member having a series of rectangular perforations 54, 54 to accommodate manually operable control switches 56, 56 which slide back and forth within slightly angled longitudinal grooves 58, 58 formed in the inner face of the switch panel 48. The switches 56, 56 are elongated bar-like members having upstanding portions 60, 60 that extend outwardly through the perforations 54, 54 in the switchboard 48. A colored insert 62 is located adjacent the upstanding portion of each switch to indicate the relative switch positions.

Figure 3:
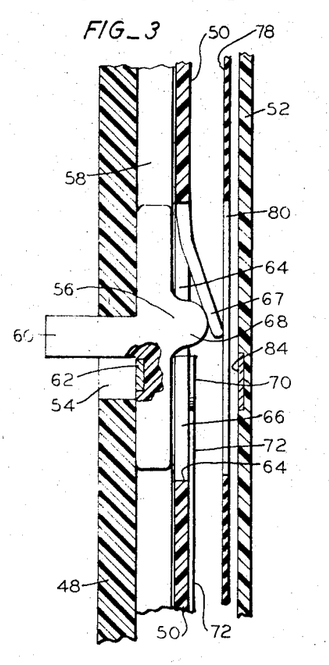
FIGURE 3 is an enlarged sectional view showing a detail of the construction of the device shown in FIGURE 2.
Figure 4:
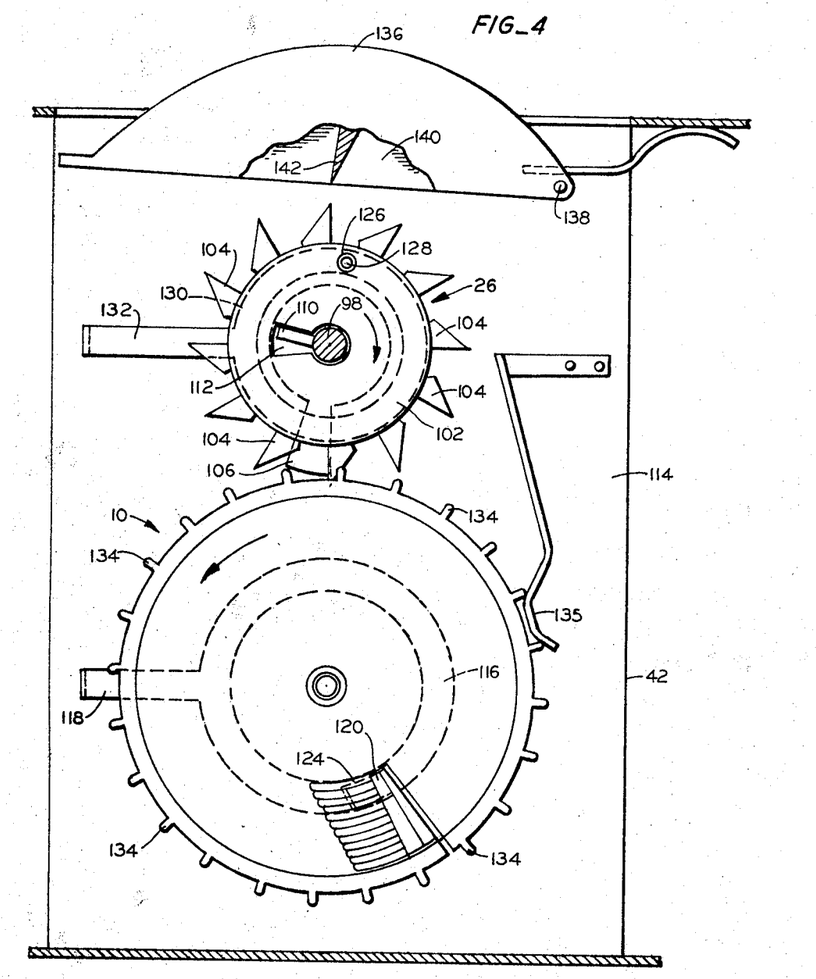
FIGURE 4 is a sectional view taken along the line 4—4 in FIGURE 2 looking in the direction of the arrows.

Behind, or inwardly of, the switchboard 48 is a contact panel 50. This panel 50 is formed from a non-conductive material and has a series of cutouts 64, 64 formed in the shape of the letter H which serve to form pairs of resilient tongues 66, 67 that are positioned behind the switches 56, 56 in the switch panels 48. The contact panel 50 is positioned closely adjacent the switchboard 48 and the tongues 64, 64 are engaged by rounded protrusions 68, 68 formed on the backs of the switches 56, 56 and are depressed thereby. When the switches 56, 56 are in their uppermost positions (as shown in FIGURE 3) the protrusions 68, 68 depress the upper tongues 67, 67 while being held in position by the edges of the lower tongues 66, 66. When the switches 56, 56 are in their lowermost positions, they depress the lower or bottom tongues 66, 66. The lower tongue 66 in each pair of tongues has a contact point 70 formed on its back side adjacent the outer end of the tongue 66 and the contact point 70 is electrically connected to similar contacts 70, 70 on every tongue 66 in the same lateral row of switches by the conductors 72, 72 (see FIGURE 5). Each lateral row of contact points 70, 70 is also electrically connected to a central contact 74 positioned on a single tongue 76 located in a vertical row of tongues 76, 76 at the center of the contact panel 50. These latter tongues 76, 76 are constantly depressed by additional protrusions (not shown) permanently formed on the back of the switch panel 48 so as to bring each of them into engagement with a contact 85 in a central row of contacts 85, 85 on the outer face 81 of the code control panel 52. The contacts 70, 70 comprise the secondary power inlet points for the system.

Figure 5:
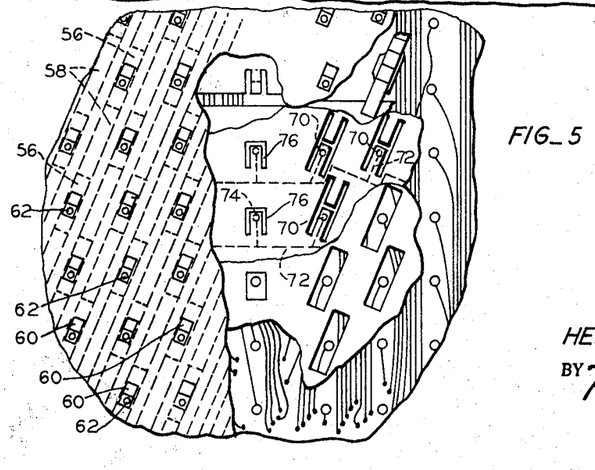
FIGURE 5 is a partial view broken away to show the relationship of the various control panels used in the device of FIGURE 2.

Interposed between the contact panel 50 and the code control panel 52 is an insulating member 78. Rectangular perforations 80, 80 behind the contact tongues 66, 67 are provided in the insulator to permit the contacts 70, 70 on the tongues 66, 66 to bear against corresponding contacts 84, 84 imbedded in the code control panel 52 when the tongues 66, 66 are depressed by the switch protrusions 68, 68. The contacts 84, 84 comprise the power outlets for the primary control system.

Figure 6:
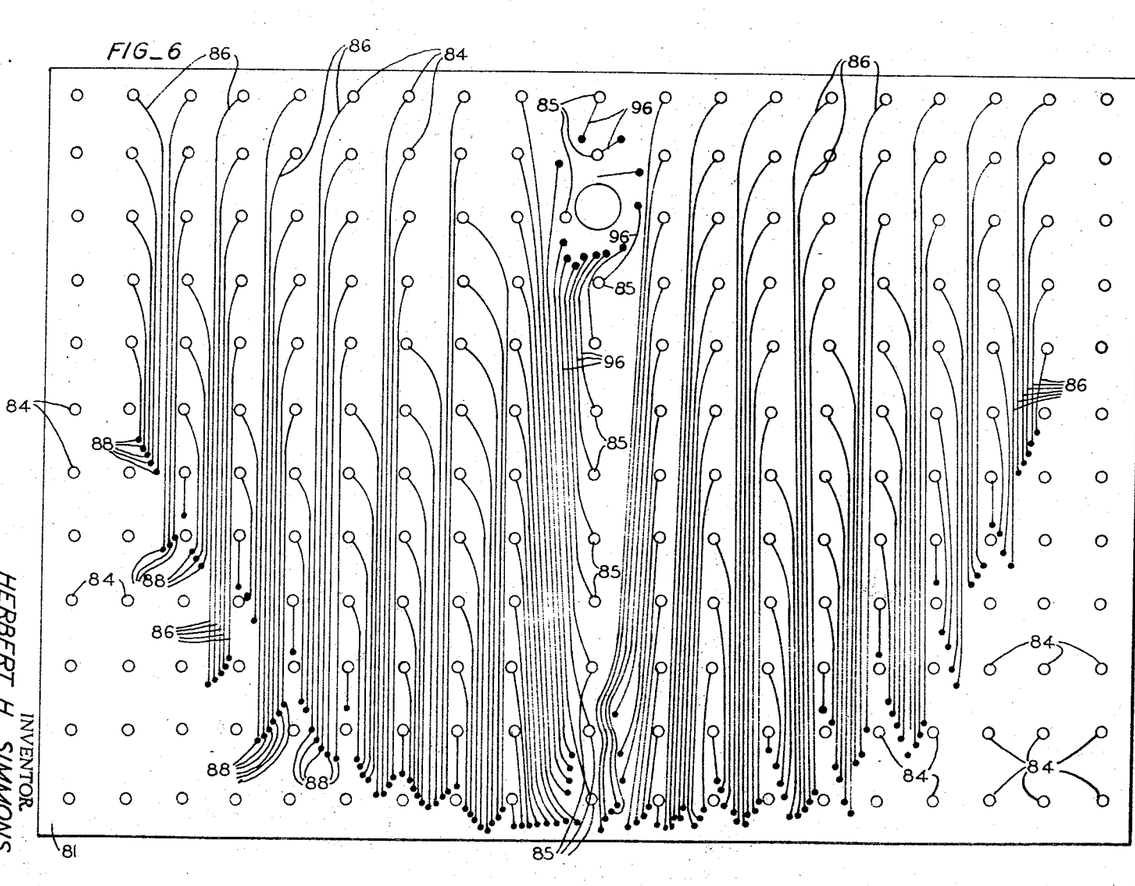
FIGURE 6 is a plan view of one side of the code control panel used in the device of FIGURE 2 showing the positions of the contact points and their connecting electrical conductors.
Figure 7:
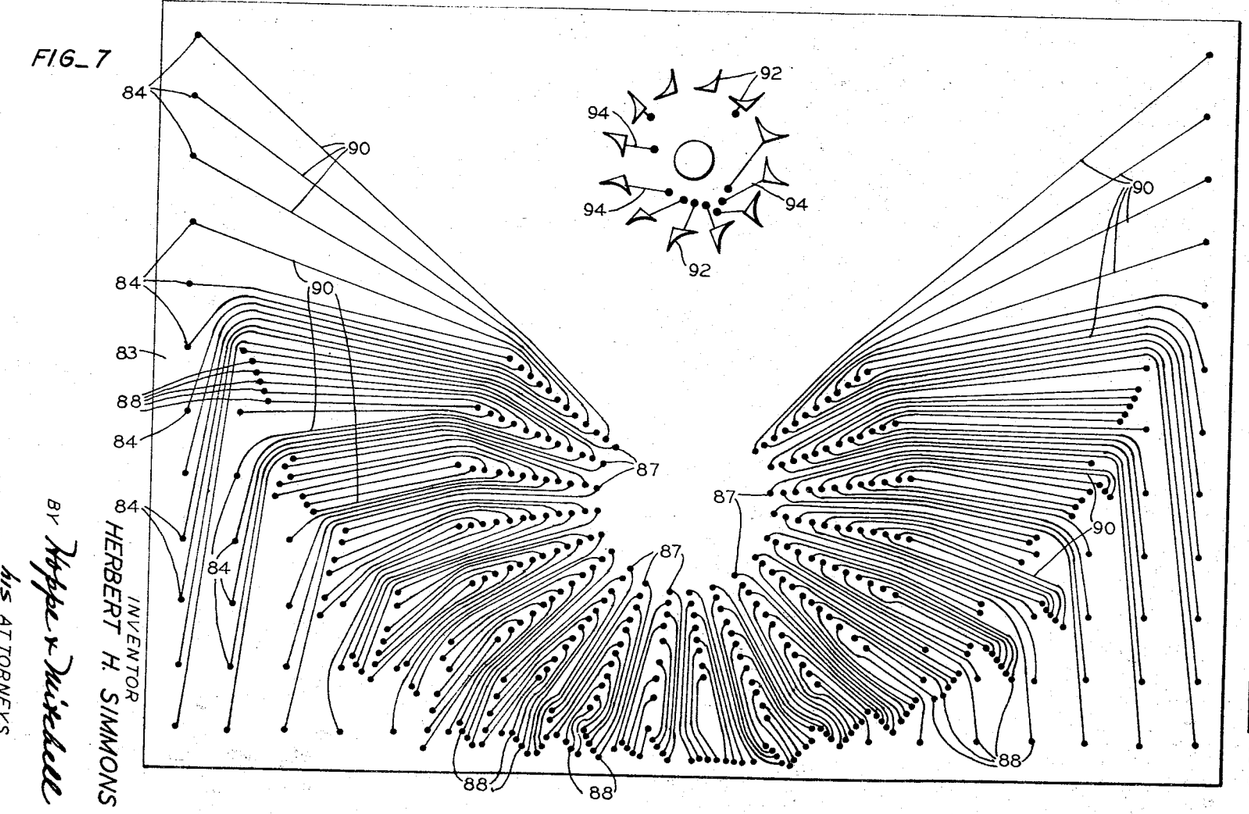
FIGURE 7 is a plan view of the opposite side of code control panel shown in FIGURE 6.

As is best seen from FIGURES 6 and 7, the outer and inner faces 81, 83 respectively, of the code control panel 52 have a series of electrical contact points and conductors imbedded therein and the contacts are interconnected in a manner providing, according to a predetermined code, a plurality of paths for the electrical current during operation. The outer side or face 81 of the code control panel 52 (FIGURE 6) has a plurality of recessed contact points 84, 84 arranged in lateral and vertical rows. Each vertical row of contact points 84, 84, except for the center row of contacts 85, 85 repersents one group of primary power outlets. Since there are eighteen rows of contact points 84, 84 on the outer face 81 of the control panel (excluding the central row of contacts 85, 85) eighteen groups of power outlets are provided in this particular control system. For convenience, each group is adapted to represent an hour of time. Since each vertical row of contact points contains twelve contacts 84, 84, the interval between pairs of contacts represents a five minute interval. The control system, therefore, provides potential power impulses at five minute intervals over a period of eighteen hours.

The contact points 84, 84 on the outer side 81 of the code control panel 52 are conected to a series of radially arranged contact points 87, 87 on the inner side 83 of the panel by conductors 86 and 90, respectively, which are also recessed in the face of the panel. The conductors 86, 86 on the outer face 81 pass through the panel at the interfacial points or contacts 88, 88 and connect with the conductors 90, 90 on the inner face 83 of the panel 52. The conductors 90, 90 connect both the interfacial points 88, 88 and the contact points 84, 84 with the contact points 87, 87. In this manner, the first group of contact points 87 (starting in a clockwise direction as viewed in FIGURE 7) is connected to each of the contact points 84, 84 in the first vertical row (starting from the left hand side as viewed in FIGURE 6) on the outer side 81 of the panel. Similarly, the second group of contact points 87 on the inner face 83 of the control panel 52 is connected to each of the contact points 84, 84 in the second vertical row on the outer face of the panel and this interconnection of the contact points 87, 87 with the rows of contact points 84, 84 is continued until each of the contact points in each vertical row on the outer side of the panel is connected to a radical group of contacts 87, 87 on the inner side of the panel.

A second arrangement of contact points 92, 92 is provided at the upper half of the inner face 83 of the code control panel 52. This ararngement includes twelve substantially triangular-shaped, contact points 92, 92 that are ararnged in a circle and which serve as the power impulse collecting stations for the collector 30. Each of the contacts 92, 92 is connected by conductors 94 and 96 to one of the center row contacts 85, 85 on the outer face 81 of the panel 52. It is thus seen that while each of the contact groups 87 is connected to a row of twelve contact points 84, 84, each of the contacts 92, 92 on the upper part of the panel 52 is connected only to a single contact 85 on the outer side 81 of the panel 52. As was previously described, each of the contacts 85, 85 in the central row is, in turn, connected with a plurality of the lateral contact points 70, 70 on the backs of the resilient tongues 66, 66 on the contact panel 50. In this way, the corresponding secondary inlet contacts 70, 70 for each group of power outlets are electrically connected to their corresponding impluse collecting contacts 92, 92 on the inner face 83 of the code control panel 52.

A central driving shaft 98 extends outwardly through the upper portion of the control device and is provided with a gear 100 on its inner end that meshes with the clock movement (not shown) so as to be driven thereby. The gear 100 is of the same size as the driving gear for the minute hand of the clock so that the driving shaft 98 rotates at a speed of one revolution per hour. Mounted on the driving shaft 98 behind the innermost or code control panel 52 is the impulse collector 30 for the control device. The collector 30 comprises a circular wheel 102 having a plurality of pointed spokes 104, 104 set in its outer periphery. The wheel 102 also has an extended arm 106 which extends outwardly beyond the periphery of the wheel so as to engage, once every revolution, a larger wheel 108 which is mounted on a stub shaft 109 and which serves as the power distributor. Rotation of the collector wheel 102 is effected by a lateral pin 110 on the driving shaft 98 that fits within a lateral key-hole shaped recess 112 in the wheel.

Imbedded in the face of an inner wall 114 is an electrical contact ring 116. The ring 116 has a lateral handle-like extension 118 to it and the extension is connected to a suitable source of electric potential (not shown). Current is picked up from the ring 116 by a conductor 120 on the distributor wheel 108. The connector 120 is made with dual arms, one being a broad rear arm 122 which picks up the current from the ring 116 and the other a comb-like outer arm 124 which passes the current on to the contact points 87, 87 on the inner side or face 83 of the code control panel 52. In this way, an electric current is transmitted sequentially to each group of power inlet contacts as the distributor wheel 108 rotates about its stub shaft.

The output current from the code control panel 52 is transmitted to a signal responsive means 26, such as an alarm bell (not shown) through the impulse collector wheel 30. For this purpose, an opening 126 is formed in the collector wheel adjacent its periphery and a pair of electrically conducting balls 128, 129 are placed in the opening. The inner ball 129 bears against a conductor ring 130 positioned behind the collector wheel 30. As in the case of the input ring 116, the conductor ring 130 has a handle-like projection 132 that serves as an electrical connection with the signal responsive means. The outer ball 128 in the opening 126 bears against the inner face 83 of the code control panel 52. As the collector wheel 102 rotates with the driving shaft 98, the outer ball 128 is moved past the circularly arranged contacts 92, 92 on the upper part of the panel 52.

Operation of the device is as follows: Each switch 56 on the switch panel or switchboard 48 is marked with a particular time interval in an eighteen hour control period in which six night hours are omitted, since alarms during the normal sleeping period ordinarily will not be desired. Accordingly, whenever an alarm is desired for a particular control interval, the user simply lifts the transparent cover 44, finds the appropriate switch and moves the upstanding portion 60 of the switch downwardly. Downward movement of the switch causes the protrusion 68 on the bottom of the switch body 56 to depress the lower tongue 66 on the contact panel 50 behind the switchboard 48. As previously explained, the tongue 66 has a contact 70 on the back side and depression of the tongue on the protrusion on the switch brings the contact 70 into engagement with a similar contaet 84 in the outer face 81 of the code control panel 52. This engagement establishes an electrical connection from the desired time interval contact 84, through contact 70, conductor 72 to the contact 74 on the tongue 76 and then to contact 85, conductors 96 and 94 to the proper collector station contact 92 on the inner face 83 of the code control panel 52. Actuation of the signal responsive means 26 at the proper future time interval then automatically occurs when the distributor 10 energizes the correct group of contacts 87, and the collector 30 reaches the proper collector station contact 92.

Rotation of the distributor wheel 108 is not continuous, as in the case of the impulse collector wheel 102, but is intermittent. Upon each revolution of the collector wheel 102, the extended arm 106 thereon engages a tooth 134, 134 on the periphery of the distributor wheel 108 and indexes the wheel one twenty-fourth of a revolution. A spring arm detent 135 prevents the wheel 108 from rotating too far. Accordingly, the collector wheel 102, which moves at the same speed as the minute hand of the clock, moves the distributor wheel 108 every hour so as to energize a different group of contacts 87. An electric current then passes from the conductor 120 on the distributor wheel 108 to one of the contact groups 87, through whichever switch has been previously closed, and through the proper conductors to the appropriate contact point opposite the collector wheel 102. The alram will not be set off, however, until the conducting balls 128, 129 on the impulse collector wheel 102 are in a position opposite the particular contact 92 so energized. As the impulse wheel 102 rotates, the two balls 128, 129 mounted therein will be brought opposite the proper contact point 92. This will occur at the proper five minute interval and will complete the circuit to the alarm bell to set off the alarm. As long as the ball 128 engages the contact 92, the alarm will continue to ring. Once the ball 129 passes the contact 92, the alarm automatically ceases. The substantially triangular shape of the contacts 92 thus permits the length of the alarm period to be adjusted by an arrangement (not shown) radially varying the point of intersection between the contact 92 and the ball 128.

Provision is also made for the manual shutting off of the alarm. For this purpose, an accurately shaped lever arm 136 is provided at the top of the device. The lever arm 136 is pivoted at one end 138 and a spring 139 serves to bias the arm to its normal position. A recess 140 is formed on the inside of the arm and a pointed finger portion 142 is formed in the recess. If it is desired to manually shut off the alarm, the user depresses a lever 136, causing the pointed finger-like portion 142 to engage the inclined surface of the spokes 104 on the collector wheel 102. The camming action provided by this engagement will advance the collector wheel 102 about its axis, moving the outer ball 128 out of engagement with the contact point 92 on the inner side 83 of the code control panel 52. The key-hole shape of the recess 112 in the collector wheel 102 permits this advance movement of the wheel 102 to take place. Ordinarily, the lateral drive pin 110 will bear against the leading edge of the recess 112, but when the wheel 102 is advanced by the downward movement of the lever arm 136, the wheel 102 is disengaged from the driving pin 110 and remains stationary until the shaft 98 has traveled far enough to bring the pin 112 back into engagement with the leading edge of the recess 112.

In the alternative form of the invention shown in FIGURES 8–12, certain modifications are made in the switchboard and the code control panel so as to provide the user with the options of either setting a continuously repetitive alarm to go off at the same hour each day or of setting a temporary one-time alarm that will be automatically erased. For this purpose, a three stage switching arrangement is provided. As will be seen in FIGURE 8, the switchboard 201 has at least one pair of vertically arranged slots 203, 205 and a third slot 217 formed therein. While only one set of such slots has been shown in the drawing, it is to be understood that there may be as many sets as desired within the available space. For the embodiment under discussion, five separate alarm settings are contemplated hence the switchboard would have four additional sets of slots but since their construction would be the same, they are not shown.

The left-hand slot 203 (as viewed in FIGURE 8) represents one of the groups of primary power outlets in the system and is provided with a number of notches 207, 207, each of which represents one outlet in a given group of outlets. Provision is made for groups of eighteen power outlets covering the hours between 5 a.m. in the morning to 10 p.m. at night. Accordingly, the slot 203 has eighteen notches 207, 207 in one side. The other alarm controls on the switchboard 201 may be arranged to cover the same time span or may overlap to pick up the missing hours not included in this alarm control. The right-hand slot 205 represents the secondary control intervals and, as in the case of the previously described embodiment, is divided into twelve parts so as to represent five minute intervals. Accordingly, the slot 205 has twelve notches 209, 209 formed in one side.

Figures 8, 9, 10:
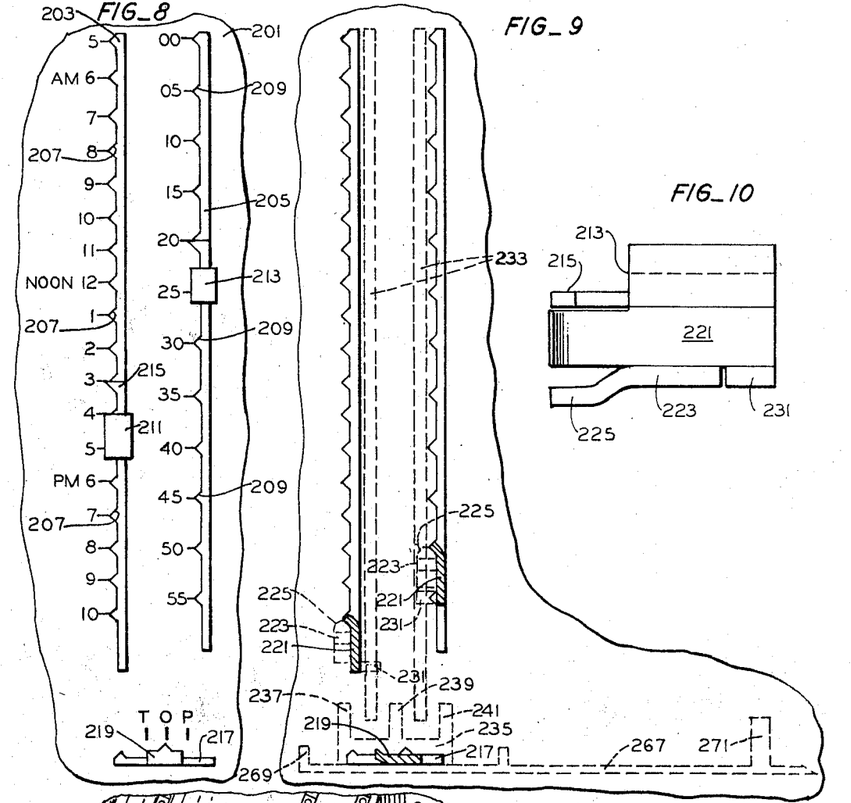
FIGURE 8 is a plan view of an alternate type of switch control panel which may be employed where automatic repetitious operation or single non-repetitious operation of the system is desired.
FIGURE 9 is a plan view partly in section similar to that of FIGURE 8 showing the switch control panel and the electrical conductors associated therewith.
FIGURE 10 is a view in side elevation of a control knob used in the switch control panel shown in FIGURES 8 and 9.

Setting of the alarm is effected by a pair of control knobs 211, 213 positioned within the slots 203, 205, respectively. Each control knob 211, 213 has a pointer 215, 215 and is slideable up and down in its respective slot. Beneath the slots, 203, 205 at the bottom of the switchboard 201 is a third slot 217. This slot is short, being roughly only as long as the distance between the two vertical slots 203, 205. A pointed indicator 219 is positioned in this slot and is movable back and forth between three positions labeled T, O, and P, which represent the temporary alarm, of and permanent alarm positions, respectively.

Each control knob has a body portion 221, 221 passing through its slot which connects with a shoe or foot portion 223, 223. The shoe or foot portions 223, 223 serve to make the necessary interconnections between the power distributor and the impulse collector. One end 225 of the shoe portion 223, 223 is bent inwardly so as to contact the code control panel 227 (FIGURE 11) which is positioned behind the switchboard 201. At its opposite end, the shoe portion 223 of the control knob has a laterally extending flange 231. The flange 231 butts against an adjacent conductor strip 233, 233 that is imbedded in the inner face of the switchboard 201. In the case of the hour control knob 211, the flange 231 extends to one side of the knob, while in the case of the minute control knob 213, the flange 231 extends to the opposite side.

The pointed indicator 219 for the third slot 217 is joined to a three-pronged connector 235 that slides between the two conductor strips 233, 233. When the indicator 219 is in the "off" position, none of the prongs 237, 239, 241 engage the conductor strips 233, 233. When the indicator 219 is moved leftwardly (as viewed in FIGURE 9) to the T position, the center and right-hand prongs 239 and 241, respectively, engage and interconnect the conductor strips 233, 233. Rightward or opposite movement of the indicator 219 brings the center and left-hand prongs 239 and 237, respectively, into engagement with the conductor strips 233, 233.

Figure 11:
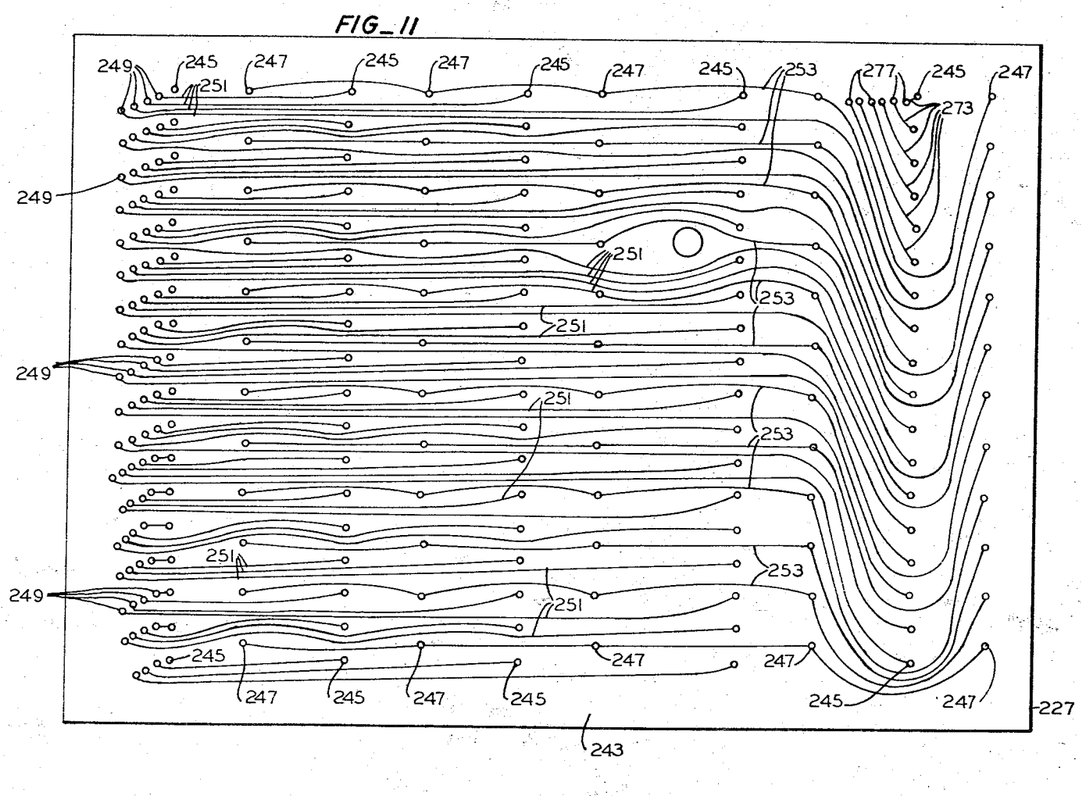
FIGURE 11 is a plan view showing one side of the code control panel used with the switch panel of FIGURE 8
Figure 12:
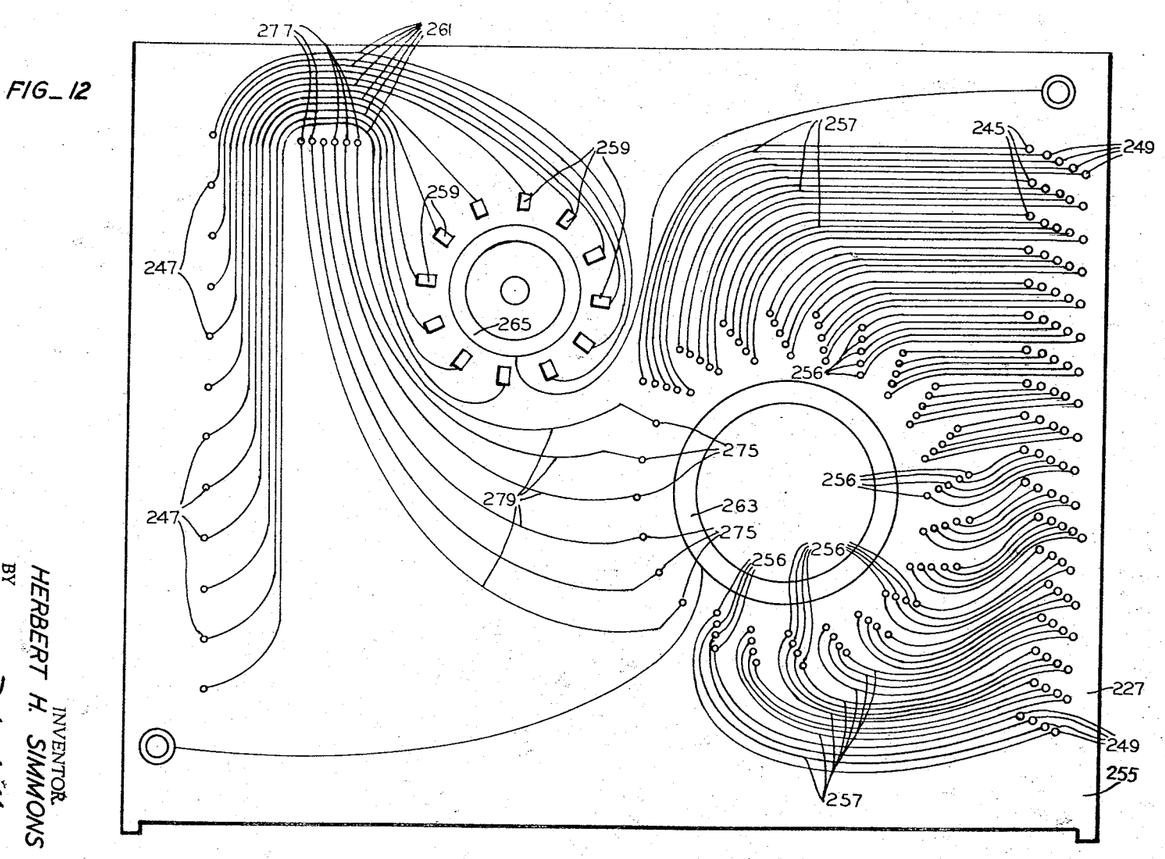
FIGURE 12 is a plan view of the opposite side of the code control panel of FIGURE 11.

FIGURE 11 shows the outer face 243 of the code control panel 227 for this alternative embodiment of the invention. As seen from the drawing, the code control panel 227 has several vertical rows of contact points 245, 245 representing the primary power outlets. Inasmuch as this embodiment of the invention contemplates five alarm settings, five rows of eighteen contacts 245, 245 and five rows of twelve contacts 247, 247 are alternately arranged on the code control panel 227. To the left of the first or left-hand row of contact points 245 (as viewed in FIGURE 11) are a number of interfacial connections 249, 249. These latter connections 249, 249 are connected with their laterally corresponding contact points 245, 245 in the rows of eighteen contacts by means of the conductors 251, 251, except that the top six contacts 245, 245 in the last right-hand row of eighteen contacts (as viewed in FIGURE 11) are not so connected. Similarly, the last or right-hand row of twelve contacts 247, 247 representing secondary power inlets are connected with their lateral counterparts in the other rows of twelve contacts by the conductors 253, 253. The rows of eighteen primary power outlets 245, 245 have their corresponding primary power inlets on the opposite or inner side 255 of the code control panel 227 forming eighteen groups of contacts 256, 256, said primary outlets and inlets are connected by conductors 251, 251 and 257, 257, the interfacial connections being made at 249, 249 with the first row of contact points 245, 245, however, forming their own interfacial connections. In the same manner, the last or right-hand row of contacts 247, 247 are also repeated on the inner side 255 of the code control panel 227 so as to form their own interfacial connections and are connected with twelve collector station contact points 259, 259 by the conductors 261, 261.

The groups of contacts 256, 256 and the collector station contacts 259, 259 are sequentially connected to the input and output rings 263 and 265, respectively, by double conductive rollers (not shown) which rotate around the centers of the rings 263 and 265, respectively, and which bridge the gaps between the contacts 259, 256 and the rings 263 and 265. In this way, each group of contacts 256, 256 and each collector station contact 259, 259 is electrically connected in sequence to the contact points 245 and 247 positioned under the switchboard 201. When the hour and minute interval arrives for which a switch has been set a circuit is established through the device and the alarm is set off.

If the pointed indicator 219 has been positioned in the P position, the alarm will ring every day at the same hour but if the indicator has been positioned in the T position, the circuit to the alarm bell will be automatically interrupted before a repetition of the alarm can occur. This is accomplished through movement of a slide bar 267 that engages the movable three-pronged connector 235 positioned behind the indicator 219. To this end, the slide bar 267 is provided with an upstanding lub 269 at one end adjacent the connector 235 and with a similar but taller lug 271 at the opposite end. Rightward lateral movement (as seen in FIGURE 9) of the bar 267 brings the first-mentioned lug 269 into engagement with the three-pronged connector 235 to thereby disengage the central and left-hand prongs 239 and 237 from the conductive strips 233, 233. Lateral movement of the slide bar 267 results from engagement between the taller lug 271 and a pin on the distributor wheel (not shown). The pin is so positioned on the distributor wheel as to engage the lug 271 at an appropriate time, such as midnight, to clear the alarm.

As mentioned previously, the alarm controls are based on eighteen hourly groups of outlet contacts, six of the night hours being omitted. However, one of the five alarms can be set to cover an eighteen hour period which would include those six hours. The outer face 243 of the code control panel 227 shown in FIGURE 11 is, accordingly, provided with conductors 273, 273 which connect the top six contacts 245, 245 in the last or right-hand row of contacts, with six extra distributor positions 275, 275 through the interfacial connections 277, 277 which are repeated on the inner side 255 of the panel 227 and the conductors 279, 279. Provision of these extra distributor positions permits the fifth alarm control to set the alarm for this six hour nighttime period which cannot be set on the other four alarm controls. The third switch assembly (or third slot 217) with its corresponding and interacting parts may be omitted, if so desired, by permanently connecting conductor strips 233, 233.

I claim:

1. In an alarm system for clocks, the combination of a driving shaft adapted to be coupled to a clock mechanism, a first control panel member; a second control panel member overlying said first control panel member; said first control panel member having electric power inlet and outlet means, and a first series of separate and disconnected contact points and a second series of contact points arranged in groups of circular patterns and positioned on one side of said first control panel member, contact points arranged in rows and positioned on the other side of said first control panel member, at least one of a pair of said rows having a contact point for each hour for which an alarm signal is desired and the other row of said pair having a sufficient number of contact points as to divide each hour into the desired alarm time intervals, said contact points being electrically connected by interfacial conductors passing through said first control panel member; a first rotatable conductor indirectly driven by said driving shaft sequentially contacting each group of said first series of contact points, a second rotatable conductor driven by said driving shaft sequentially contacting each of said second series of contact points; a plurality of switching means positioned on said second control panel member, said switch means engaging said contact points positioned on the said other side of said first control panel member; manually operable means for opening or closing said switch means in a predetermined pattern; and means interconnecting said switch means and said first and second rotatable conductors in a series with said power inlet and outlet means.

2. In an alarm system for clocks, the combination of Claim 1, having manually operable means to shut off the alarm without disturbing any switch settings.

3. In an alarm system for clocks, the combination of claim 2, wherein said manually operable means interrupt the electrical contact between a movable conductor and the contact point engaged by said conductor.

4. In an alarm system for clocks, the combination of Claim 1, having switch means for selectively engaging a contact point in one row of contact points, additional switch means for selectively engaging a contact point in the other of said pair of rows of contact point manually operable control means for electrically interconnecting and disconnecting said switch means to make or interrupt the alarm circuit, said control means operable in at least two positions to interconnect said switch means, and time actuated means for engaging said control means in one of said two positions to move said control means and disconnect said switch means.

References Cited

UNITED STATES PATENTS

| | | | |
|---|---|---|---|
| 3,200,218 | 8/1965 | Wagner | 340—309.4 X |
| 951,148 | 3/1910 | Ragan | 340—309.5 |
| 1,369,146 | 2/1921 | Thomas | 340—309.4 |
| 3,027,506 | 3/1962 | Stenhammar | 340—309.4 |
| 3,284,790 | 11/1966 | Nobles | 340—309.4 |

FOREIGN PATENTS 93,170 10/1957 Denmark.

JOHN W. CALDWELL, *Primary Examiner.*

H. I. PITTS, *Assistant Examiner.*

U.S. Cl. X.R.

200—037; 340—150, 309.5